United States Patent [19]

Wüstefeld

[11] 4,178,163

[45] Dec. 11, 1979

[54] METHOD FOR THE MANUFACTURE OF FOAMED GLASS

[76] Inventor: Claus Wüstefeld, Panoramaweg 17, D 7035 Waldenbuch, Fed. Rep. of Germany

[21] Appl. No.: 869,950

[22] Filed: Jan. 16, 1978

Related U.S. Application Data

[63] Continuation of Ser. No. 692,571, Jun. 2, 1976, abandoned.

[30] Foreign Application Priority Data

| Jun. 5, 1975 | [DE] | Fed. Rep. of Germany | 2524981 |
| Aug. 5, 1975 | [DE] | Fed. Rep. of Germany | 2534874 |
| Feb. 14, 1976 | [DE] | Fed. Rep. of Germany | 2606049 |
| May 15, 1976 | [DE] | Fed. Rep. of Germany | 2621688 |

[51] Int. Cl.$^2$ .............................................. C03B 19/08
[52] U.S. Cl. .................................... 65/22; 106/40 V
[58] Field of Search ................ 65/22, 20, DIG. 14; 106/40 V

[56] References Cited

U.S. PATENT DOCUMENTS

| 2,337,672 | 12/1943 | Long | 106/40 V |
| 2,399,225 | 4/1946 | Heany | 106/40 V |
| 2,596,669 | 5/1952 | Ford | 106/40 V |
| 3,325,264 | 6/1967 | Marceau | 65/22 |
| 3,342,572 | 9/1967 | MacAvoy | 65/22 |
| 3,546,061 | 12/1970 | Kraemer et al. | 65/22 X |
| 3,663,249 | 5/1972 | Rao | 65/22 |
| 3,867,156 | 2/1975 | Fukumoto et al. | 65/22 X |
| 3,870,496 | 3/1975 | Cubler | 65/22 |
| 3,932,140 | 1/1976 | Jayawant et al. | 106/40 V X |
| 3,951,632 | 4/1976 | Seki | 65/22 |

FOREIGN PATENT DOCUMENTS

623806 5/1949 United Kingdom.

*Primary Examiner*—Kenneth M. Schor
*Attorney, Agent, or Firm*—Spencer & Kaye

[57] ABSTRACT

A method for the manufacture of foamed glass includes providing a mixture of a finely divided glass and a bonding agent. The bonding agent is selected from the group of aqueous solutions of the oxygen acids of beryllium, boron, aluminum, silicon, germanium, arsenic, antimony, tellurium, polonium, astatine and phosphorous, the aqueous solutions of the anhydrides of the oxygen acids, and the aqueous solutions of the salts formed by the oxygen acids and the basic oxides, and basic hydroxides of beryllium, boron, aluminum, silicon, germanium, arsenic, antimony, tellurium, polonium, astatine and of the transition metals having a variable oxidation number. The mixture is dried at a temperature from 20° to 600° C. to thereby transform the bonding agent into a gel having water bound thereto. The dried mixture is heated to a temperature from 800° to 1,000° C. to thereby melt the mixture and release the bound water from the gel. The released water forms a vaporous cellulating agent which effects the foaming of the molten glass.

20 Claims, No Drawings

METHOD FOR THE MANUFACTURE OF FOAMED GLASS

CROSS REFERENCE TO RELATED APPLICATION

This application is a continuation of application Ser. No. 692,571 filed June 2, 1976 and now abandoned.

The invention relates to a method for the manufacture of foamed glass wherein a powdery mixture of glass, volcanic glass material and/or other glass containing materials, a blowing agent and water—if necessary after having been moulded—is dried at temperatures from 20° to 600° C. and subsequently heated to 800° to 1000° C. for being foamed.

A method of this type is known from GB-PS Nos. 623 806 and 623 807. In the known method lamp black is used as blowing agent. For the formation of foamed glass powder layers of 25 mm thickness are first heated to 800° C. for 41 h and subsequently to 875° C. for 35 min. A heating period of nearly 2 days precludes an economical manufacture of foamed glass according to the known method. From OE-PS No. 283 179 a method for the manufacture of glass-like, coarse moulded bodies is known, wherein a solution of glass fibres or glass powder in water glass is prepared, the solution evaporated and the residue ground to a powder which can subsequently be processed to porous moulded bodies by heating. In this method a very large quantity of energy is required for the evaporation of the water glass solution which also renders this method uneconomical.

Attempts to manufacture foamed glass according to the method described at the beginning by the combustion of carbonaceous blowing agents without applying the heat control known from the British patent specifications result in an inadequate foam structure, in particular in open-celled foams as well as in bubbles of strongly varying sizes.

Accordingly, the object of the invention consists in providing a method for the manufacture of foamed glass which results to a product with closed cells of small size and which is economically feasible. This implies that waste glass can be used as starting material and that the energy requirement remains within acceptable limits.

According to the invention, this object is achieved in that solutions of oygen acids of metalloids and phosphorus and/or solutions of oxygen acid salts with basic oxides or hydroxides of metalloids or transition metals having a variable oxidation number are used as bonding age nts which form gels during drying the water content of which acts as blowing agent.

The use of these bonding agents ensures that in the gel obtained during the bonding process very finely dispersed water is combined which is subsequently able to act as blowing agent. At the same time it is possible by means of the bonding agent to form very solid moulded bodies already in the green state (initial state) which can be foamed without using additional moulds.

Thus, the continuous application of the method is also possible. The fine dispersion of the water in the gel results in the desired pore fineness and uniformity of the foamed glass. In this connection it is of special importance that the water is set free only when the glass changes into the melted state. This is due to the fact that the metalloids themselves are glass formers. Consequently, during the foaming process in the temperature range from 800° to 1000° C. they themselves change into a glass-like state, that is to say they combine with the glass to be foamed and simultaneously release the water in the form of water vapour which acts as blowing agent. At the same time it is ensured that the structure of the bonding agent does not impede the foaming process because, due to the transition of the metalloid compounds into the glass-like state, the bonding agent structure disappears. This also applies to bonding agents on a phosphate basis. Generally, the ratio of glass to bonding agent is 100:0.5 to 10.

The phosphate binding which can successfully be used also in the method according to the invention is certainly known as such and has increasingly gained importance in the recent years, however, the known application mainly lies in the refractory range.

Applications not belonging to the refractory range are, for example, the so-called embedding compounds in the electrical industry, the manufacture of prefabricated, fire-resistant insulations elements and the use as bonding agent in the quartz sand pigmentation. It is to be expected that the possible applications of special phosphates will further increase. The setting reactions of the individual special phosphates are described in a different manner, depending on the reactivity of the raw materials to be combined with the phosphates and on the chemical properties of the phosphates themselves.

In the manufacture of foamed glass refractory binders of this type have remained completely unknown. Obviously, possible applications have not been discovered because glass itself in the temperature range of the manufacture of foamed glass is generally considered as bonding and fluxing agent and because there seemed to be no use for an additional bonding agent.

Metalloids are beryllium, boron, aluminum, silicon, germanium, arsenic, antinomy, tellurium, polonium, and astatine. The transition metals essentially are the elements of the III. to VIII. auxiliary groups of the periodic system of the elements. These include in particular manganese, iron, cobalt, arsenic, and antimony which are especially suited for the method according to the invention. The preferably used oxygen acids are phosphoric acid, boric acid, silicic acid, arsenious acid, and antimonious acid or the anhydrides of the acids of arsenic and antimony. In addition, acid oxides of the transiton metals, such as $MnO_2$ or difficultly soluble secondary and tertiary salts of the components of the bonding agent can also be introduced. When using oxygen acids and salts of these acids with metal hydroxides the ratio of acids to metal hydroxides preferably is 3:1 to 1:1.

Consequently, the invention, among others, covers the use of phosphates, silicates and borates as bonding agents, the salts of oxygen acids of phosphorus and of the metalloids boron and silicon being concerned, furthermore the use of opal, i.e. colloidal silicic acid and finally the use of salts of phosphoric acid and of a metal oxide and metal hydroxide base the basicity of which decreases with increasing valency, in connection with oxidizing or reducing agents, such as manganese phosphate and vanadium phosphate. This concerns the salt of an oxygen acid of phosphorus with a basic oxide or hydroxide of the transition metals manganese and vanadium.

It is decisive for the success of the method according to the invention in its general embodiment that, as bonding agent, oxygen compounds of metalloids are used which have an acid and basic as well as an oxidizing and reducing action, such as the arsenious acid As(OH)$_3$ or its anhydride As$_2$O$_3$. This compound combines all properties which can also be obtained by the substance combinations according to the invention, for example of pyrolusite and phosphoric acid. By means of a comparison of arsenious acid and a combination of manganese-(III)-phosphate and phosphoric acid the reactions taking place when using the method according to the invention can be explained most clearly.

The arsenious acid is not only able to dissociate as acid but also as base, namely as follows:

$$AsO_3''' + 6H^{\cdot} = As^{\cdots} + 3H_2O \tag{1}$$

Analogously, manganese-(III)-phosphate dissociates into phosphoric acid:

$$MnPO_4 + 2PO_4''' + 9H^{\cdot} = Mn^{\cdots} + 3H_3PO_4 \tag{2}$$

A corresponding reaction is also $$MnNaSiO_4 + 2NaSiO_4''' + 9H^{\cdot} = Mn^{\cdots} + 3H_3NaSiO_4. \tag{3}$$

An appreciable proportion of As$^{\cdots}$ or Mn$^{\cdots}$ ions is present in strongly acid solutions only. Otherwise the dissociation equilibrium, to a very high degree, is shifted to the left. All three cases are characterized by the oxydation state 3 which is important for the use as bonding agent in the foamed glass manufacture. At most, the oxydation state 4 could also exist, in particular, if silicic acid is used. The same also applies if, instead of manganese oxide, the oxides of other transition metals, such as dioxides of iron or vanadium, and instead of acids in the equations (1) through (3) boric acid is used. Here, the equation (1) may always serve as a model. In this connection, the arsenious acid has the following important properties:

1. It has an oxidizing and reducing action.
2. The lowest oxidation state is the state 3.
3. It acts as aqueous bonding and blowing agent.
4. It is a glass former itself.
5. It acts simultaneously as acid and base (equation (1)).

The same properties must be required from all utilizable substance combinations, in particular the latter must dissociate according to the equations (1) through (3). This requirement is, for example, met by the use of manganses ore. Due to the manganese ore content the composition of the introduced glass is clearly changed in a manner which is particularly favourable for the manufacture of foamed glass. MnO$_2$ in the form of glass-maker's soap indeed oxidizes the components carbon, sulphides and iron-(II)-silicates contained in the fused glass mass and converts the last-mentioned compound into the threevalent state:

$$2NaPO_3 + MnO_2 + FeSiO_3 = 2(Fe,Mn)PO_4 + Na_2SiO_3$$

When heating in the fused glass mass the oxidation also takes place in the presence of the bonding agents which are mentioned in the equations (1) through (3). This control is necessary in order to prevent devitrification with increasing basicity. The arsenious acid meets this requirement by itself because it possesses all the properties which are necessary for this purpose. Wetting of the batch with a 16.6% H$_3$PO$_4$ solution may also be a measure for the control of the reaction.

In the use of silicates as bonding agents the ratio of manganese oxide to SiO$_2$ in the oxidation state 3 preferably is 1:3 and in the oxidation state 4 preferably 1:4. Practically, however, the ratio 1:3 is always to be used because MnO$_2$ is always reduced to Mn$_2$O$_3$.

The reduction in the foamed glass down to the oxidation state 2 according to $$Mn_3(PO_4)_2 + 4PO_4''' + 18H^{\cdot} = 3Mn^{\cdots} + 6H_3PO_4$$

is also imaginable, nay a reduction down to the oxidation state 0, i.e. down to the metallic manganese. This, however, is to a certain degree accompanied by a devitrification which in some cases is desired. In general, the use of tertiary phosphates, for example Ca$_3$(PO$_4$)$_2$ or Mg$_3$(PO$_4$)$_2$ or Mn$_3$(PO$_4$)$_2$ as well as the reaction product from talcum and phosphoric acid, results in devitrifications, turbidity and, in the presence of sulphur in any form, in sulphides. Due to inadequate oxidation, sulphides which are already present in glasses are not eliminated. Foaming is thereby reduced, the weight per unit volume of the foamed glass is increased and the violet colour of the glass disappears due to threevalent manganese. Consequently, this variant of the method according to the invention is of importance in cases where foamed glass with a relatively high weight per unit volume is desired. A particular advantage of this glass consists in that the sensitivity to temperature changes decreases.

In general, it can be stated with respect to the action of the bonding agent according to the invention at the lowest oxidation state that very small bubbles are being generated the diameter of which, in most cases, is far below 0.5 mm, while the weights per unit volume are in the order of 0.5 through 1.5 g/cm$^3$. These bodies show a considerably higher resistance to thermal shocks than normal foamed glass bodies As has already been mentioned, the mixture may contain opal. Opal belongs to the amorphous minerals of the class AB$_2$.nH$_2$O in the cristallochemical mineral system in which A and B designate an atom each and n an integral number. A mineral of this type can advantageously be used in a quantity up to approximately 25% by weight related to the total weight of the mixture.

It has been found that, in the case of the use of these minerals which belong to the first order of the group 1I in the cristallochemical mineral system, foamed glass bodies with a pore size of approximately 1.5 mm are obtained without paying special attention to the heat supply control. On the contrary, the mixture containing the powdery glass and the mineral can very rapidly be heated to the fusing temperature which is in the order of 850° to 950° C. when using powdery silicate glass. The residence time at this temperature may approximately be 15 minutes. Subsequently, very rapid cooling down to approximately 500° C. may follow again, whereupon a slower expansion cooling down to approximately 200° C., which is generally necessary in the manufacture of glass, must follow.

The foamed glass bodies can then be removed from the heating furnace and cool off in the open air.

The excellent action of the blowing agents employed according to the invention can be explained by the fact that the amorphous minerals of the class stated give off the combined water only after the glass has melted so that the subsequently generated water vapour is sufficient for foaming. Since the water is completely given off and immediately converted to vapour, the foaming process is completed within a short time so that the heating period and a heat gradient in the glass body during the cooling down do not affect the foaming process and the cell formation. The finepored structure, may be attributable to the fact that the amorphous material cannot only be particularly finely distributed but also the mentioned minerals dissolve in the fused glass mass so that an almost molecular distribution is achieved. Amorphous, aqueous minerals of the class stated are available in nature mainly in the form of opal and minerals containing predominantly manganese oxide. A synthetic mineral of this type of precipitated, amorphous, water-rich silicic acid. Consequently, this compound corresponds to opal which is aged, colloidal silicid acid. Minerals containing mainly manganese oxide are existing in various forms. $MnWO_2 \cdot nH_2O$ is generally called wad. In addition to manganese, wad may also contain barium, aluminium, lead, nickel, lithium, and tungsten. Wad rich in copper is also called cupreous manganese ore, wad rich in cobalt is called asbolan, ferrous wad is called reissacherit, wad rich in barium is called psilomelan. A form particularly suited for the invention is manganese black which, in addtion to manganese oxide, also contains silicon oxide and iron oxide.

For the manufacture of foamed glass with the weight per unit volume of 150 kg/m$^3$ relatively small quantities are required. If manganese black is used, additions of 0.2 to 2.5% by weight are already sufficient. The quantities of the additions in themselves may optionally be increased as long as they do not excessively increase the fusing temperature of the silicate glass. In case opal is used, quantities of approximately 5% by weight may advantageously be used. However, these quantities may be increased up to 25% by weight, provided that a silicate glass with a low fusing temperature has been chosen for the manufacture of foamed glass. For the adjustment of the fusing point further additives, such as basalt powder, boric acid, etc., may be added to the silicate glass. The addition of phosphates has a favourable effect on the achievement of small-sized cells.

In the case of the combined utilization of phosphates as bonding agents and of the salts of the phosphoric acid and of a metal oxide or metal hydroxide base the basicity of which decreases with increasing valency, in connection with oxidizing or reducing agents as blowing agents, the bonding agents not only allow the manufacture of moulded bodies mentioned above and, in particular, the performance of a continuous process but also simultaneously cause a particularly fine distribution of the blowing agent due to the formation of complex compounds, in connection with the particularly strong combination of the water up to relatively high temperatures at which glass is already in the molten state. Moreover, the metal oxides used for the manufacture of the phosphates set free oxygen which not only immediately serves as blowing agent but also oxidizes impurities contained in the glass, whereby, on the one hand, the glass is clarified and, on the other hand, further gaseous compounds are generated, such as sulphur dioxide, which act as blowing agents. By means of the invention it is therefore possible to manufacture very fine-pored uniform foamed glass bodies with a density of less than 0.2 g/cm$^3$. Phosphates which are suited for the method according to the invention are in particular manganese phosphates, vanadium phosphates, chromium phosphates, and zinc phosphates. Among these phosphates manganese phosphates are particularly suitable because $MnO_2$ which is used for its manufacture is available in large quantities at low costs. The use of vanadium phosphates could have the particular advantage that simultaneously present $V_2O_5$ additionally contributes to a reduction of the surface tension of the fused glass mass. This favours foaming of the glass.

Owing to their good solubility sodium phosphates are particularly suited as bonding agents. In this connection, in particular sodium metaphosphate can be used.

In the method according to the invention the oxidizing agent causes a conversion of the salt from tertiary salts to phosphoric acid, with the same formation of metal oxides. Thus, it is in particular possible to introduce secondary and/or tertiary manganese-(II)-phosphates and, for example, $H_2O_2$ as oxidizing agent into the mixture so that during the setting of the mixture primary manganese phosphates as well as possibly phosphoric acid and manganese dioxide are obtained which immediately form complexes. The formation of pyrophosphates is also possible. For this purpose an alkali can also be added to the mixture to ensure that phosphoric acid generated by the oxidation of the metal to the metal oxide is transformed into soluble phosphates which are suitable as bonding agents.

It is of special importance for the method according to the invention that the thermal dehydration of alkali monophosphates occurring during the drying of the mixture results in the formation of high-molecular polyphosphates.

Accordingly, the dehydration of phosphoric acid results in the formation of polyphosphoric acids. The Graham's salt obtained by the condensation of $NaH_2PO_4$ in particular combines with polyvalent ions. Thus, from $NaH_2PO_4 + MnO_2$ a polyphosphate is obtained the chain length of which depends on the temperature and water vapour pressure of the fused mass. The fused masses of condensated phosphates solidify to a glassy mass. The condensation product from

$$NaH_2PO_4 + MnO_2 + 4H_2SiO_3$$

plays a special role in the foamed glass manufacture using the method according to the invention, since it gives off the residual quantity of water which is necessary for foaming only at 840° C., i.e. at a foaming temperature which is favourable for the usual batch.

If, for example, $NaH_2PO_4$ is admixed to a powder of ordinary glass (glass waste of window panes, bottle glass, etc.) and if the mixture is subjected to a thermal dehydration there will be no difference over the dehydration of pure $NaH_2PO_4$ in the free atmosphere. Without side reactions will the glass occurring, a high-molecular polyphosphate is obtained which dissolves in ordinary glass with increasing temperatures. It will also not crystallize out after annealing over a long period. Admixed metal oxides, for example $MnO_2$, are easily dissolved to complex polyphosphates which are extremely stable so that, for example, a tertiary phosphate could not be precipitated with any precipitant.

The water given off during the condensation of the primary sodium phosphate in the foamed glass batch causes very fine bubbles to be formed in the fused glass mass. The simultaneous admixture of $NaH_2PO_4 + MnO_2 + 4 H_2SiO_3$ to glass powder, after heating to 840° C. results in a uniform foaming process, while all the residual water is given off. The use of amorphous aqueous wad $MnO_2 \cdot xH_2O$ together with silica gel $SiO_2 \cdot xH_2O$ is very appropriate.

During the implementation of the method according to the invention the molecules of the bonding agent, already considerably below the reaction temperature proper, in the so-called cover period, cover the surface F of the glass powder with a monomolecular layer. From this a measure for the quantity y in grammes of the bonding agent to be introduced per 100 g of the powdery mixture is obtained, namely:

$$Y = (M/F_M) \cdot 2 F \qquad (4)$$

where M is the molecular weight of the bonding agent, $F_M$ the area of monomolecular layer, which is to be covered by the quantity M, and F the BET area of the powdery mixture. Now, if the temperature is increased the adsorbed components react with the adsorbent under the formation of surface compounds.

Summarily, the energetic peculiarity of surfaces is covered by the concept of the surface energy $\sigma$, i.e. the mechanical energy stored in the surface which is larger in the finely divided state of the substance than in the compact state and which consequently is able to create additional new surfaces during the foaming process. In this connection the only fact that matters is the summary determination of the energetic peculiarities of the surface of the finely divided glass, measured in $m^2/g$, i.e. it is not the size of the individual particles that matters but the total surface. This, for example, offers the possibility of manufacturing from glass powder with the BET area 0.5 $m^2/g$ a mixture with a large means surface energy by adding a small quantity in a particularly finely divided condition, for example with the BET area of 10 $m^2/g$ and by covering the total surface with a monomolecular layer of the bonding agent and after increasing the temperature to the fusing and foaming point, the possibility of creating a number of new surfaces corresponding to the higher surface energy, i.e. foaming at a higher temperature. A larger quantity of the bonding agent than required for the monomolecular covering of the surface results in an additional increase of the surface of the films, i.e. in undesired larger bubbles or cells of the foamed glass.

The equation (4) therefore specifies the maximum bonding agent quantity in g per 100 g of starting material with the BET area F which is mainly required in cases where a thin and hard supporting layer is simultaneously to be generated on the surface of the moulded bodies. This layer obviously develops as a result of an enrichment of the bonding agent on the surface of the moulded body from wetted masses during the drying process. The production of a hard layer is for example of considerable practical technical importance in the flat roof construction. Instead of the addition of a small quantity of glass powder in a particularly finely divided state, i.e. instead of the mechanical method for the production of starting products with a high BET area less expensive chemical methods can be used. Methods of this type are described in the examples of application 6 and 7. The covering consists of condensated surface films having a considerable cohesion. According to known relations the surface pressure of condensated films is equal to the reduction of the surface tension.

The humid mixtures prepared with the bonding agents are easily mouldable and hardenable after the moulding by heating to approximately 200° C. The hardening is of special importance because during this process, on the surface of the moulded body, a firm layer forms, preventing the penetration of gas, which later on, during the foaming process, favours the expansion in the vertical direction. However, special advantages of the hardening consist in the easy handling of the hardened plates owing to high green strength and in the saving of moulding boxes.

This results in the following continuous process sequence: mixing and grinding of the batch to the fineness predetermined by the bonding agent quantity, with wetting of the mass, filling of the mass into the receiver of an extruder the outlet openings of which determine the shape and cross-section of the emerging endless strand which then is successively passed through drying, foaming and expanding ovens without interruption. As is known, in the powder process, prior to the foaming, the powders sinter to sintered plates which are liable to burst into pieces. This is not the case in the method according to the invention. The hardened ribbon remains intact at the sinter temperature.

The same mixtures can also be processed in the dry condition according to the powder process by producing them by means of dry mixing and dry grinding. As a function of the surface of the ground material they contain the same bonding agent quantities as in the case of the wet process in the dry form.

In the following the invention is explained in more detail by way of examples.

EXAMPLE 1

100 g glass powder with additions of 6.12 g sodium metaphosphate $(NaPO_3)_6$, 0.36 g soot and 0.135 g iron sulphate $FeSO_4.2N_2O$ are ground in the ball mill to a fineness of 1 $m^2/g$ and mixed with sufficient water to yield a workable mass. From this mass a plate is formed which is dried and hardened at 200° C. The quantity of 6.12 g sodium hexametaphosphate has been calculated according to the equation (1). The solid plate is heated to foam at approximately 880° C. and kept at this temperature for 15 to 30 minutes. Subsequently follows cooling down to approximately 500° C. in the air and further slow cooling down for expansion in the expansion oven.

EXAMPLE 2

A mixture of 80 g glass powder and 20 g basalt powder with addition of 8.26 g $(NaPO_3)_6$, 1.2 g SiC (particle size 3 $\mu m$) and 0.135 g $FeSO_4.2H_2O$ is ground in the ball mill to a fineness of 1.35 $m^2/g$ BET area and further treated as per example 1.

EXAMPLE 3

A mixture of 80 g glass powder and 20 g basalt powder with additions of 0.80 g boron phosphate, 4.60 g $(NaPO_3)_6$, 0.36 g soot, and 0.135 g $FeSO_4.2H_2O$ is ground to a fineness of 1.5 $m^2/g$ and further treated as per example 1.

EXAMPLE 4

Mixtures according to the examples 1-3 with the corresponding powder fineness are mixed with sufficient water to become easily mouldable. They are filled into the receiver of an extruder, moulded to an endless strand of the desired plate cross-section and, for drying, slowly passed through a continuous heat-treatment oven of 200° C. and subsequently through a continuous heat-treatment oven the annealing zone of which is set between 880° to 900° C. The product leaving the oven is cut to respectively desired lengths.

EXAMPLE 5

Dry mixtures corresponding to the fineness and composition given in examples 1–3 are heated to 880° C. in metal moulds and cooled down in the expansion oven after a residence time of 15 to 30 minutes.

EXAMPLE 6

A mixture of
50% ground basalt with a fineness of 0–0.1 mm
20% sodium metasilicate-5-hydrate
7.5% $H_3BO_3$
22.5% water
is prepared in the ball mill. During this step, first the water-soluble components are dissolved and by reaction with one another precipitated to very finely divided products with a large surface so that on the dried mixing product a surface of approximately 20 $m^2/g$ can be measured.

The humid mixture is mixed in a kneader with sufficient glass powder (ordinary glass) with a surface of 0.5 $m^2/g$ so that a mouldable mass is obtained which is further processed in the same manner as in example 4. The proportion of glass in the mixture may be optionally increased in the case of further water addition and foaming agents such as SiC with a maximum particle size of 3 $\mu$m may be added to the total mixture.

EXAMPLE 7

The mixing product from the ball mill according to example 6 can be dried, crushed to flour fineness, treated with foaming agents and heated in a metal mould to 800° C. This results in a fine-cellular foamed product. The dry product can previously be mixed with an optional quantity of glass powder.

Within the framework of the present invention glass powder is preferably defined as the crushed product from ordinary glass, in particular waste glass which is available in large quantities in form of waste bottles.

In the examples 6 and 7 use is made of the fact that, as a function of the mean surface size of the solid components, the required bonding agent quantity is respectively determined according to the relation $$Y = (M/F_M) \cdot 2F$$

since by the addition of glass powder, the mean surface size is regularly decreased with a decrease of the bonding agent quantity.

The figures given on surface sizes are always BET surfaces ($m^2/g$).

The activation by lattice disturbances of layer lattices also belongs to the summary determination of the energetic pecularities of surfaces. From this results the possibility of manufacturing powder mixtures with larger mean surface energy by adding activated substances with layer lattices in order to generate a number of new surfaces corresponding to the higher surface energy, i.e. to foam at a higher level when foaming the mixture. The tests have shown that the effects with additions of ground mica and talcum are very great; additions of 1% are completely sufficient. By heating these minerals to temperatures above 800° C. an aggregate of two-dimensional crystals is obtained since by the expelling of the crystal water the coherence of the layers by means of van der Waal's forces is no longer ensured. The minerals are only active in the aforementioned sense if their crystal structure has not previously been destroyed by fine-grinding. The used mineral substances with layer lattice had a particle size of 0.1 mm and more. Moreover, the escaping crystal water increases the quantity of the swelling gases.

EXAMPLE 8

A mixture of 85% glass powder and 15% ground basalt is treated with respectively 1 g boron phosphate, silicon carbide and talcum. Silicon carbide has a particle size from 0 to 1 $\mu$m, talcum had particle sizes 50% of which were above 0.1 mm. The foamed glass manufactured from this mixture in the powder process had a weight per unit volume of 0.15 $g/cm^3$.

The mixture was ground in the ball mill to a BET surface of 1 $m^2/g$.

EXAMPLE 9

A mixture of 99.5 parts of glass powder (by weight) and 0.5 parts manganese black (by weight) was ground to a fineness with a BET surface of 1 $m^2/g$ and subsequently heated to 875° C. in a metal mould. After cooling down a foamed glass body with closed cells has been obtained in which the cell diameter was approximately 1.5 mm. With the weight per unit volume of 150 $kg/m^3$ the compressive strength was approximately 15 $kg/cm^2$. The coefficient of thermal conduction determined as per DIN 52 612 was approximately 0.040 kca/mh °C. at 25° C.

EXAMPLE 10

First, 98.00 g glass powder with a fineness or surface of 0.5 $cm^2/g$, 2.00 g basalt powder, 2.30 g $(NaPO_3)_x$, 9.20 g Na-trisilicate with a water content of 20% and 1.20 g sodium metasilicate-5-hydrate are mixed in dry condition.

Subsequently the mixture is wetted with 20 g water and finally dried at approximately 200° C. Drying after previous wetting is necessary for the combination of the water required for foaming at 840° C. Subsequently the solid mass was finely ground while adding 4.00 g manganese ore (FUS 7880-100 of Mssrs. Frank & Schulte, Essen).

The processes of dehydration, condensation and fusion taking place when the abovementioned minerals are used are the same if the phosphates are mixed with powder of ordinary glass, the polyphosphates being dissolved in the glass when the basic glass is in the fusible state. The foaming reaction, protected from the atmosphere, takes place in a monomolecular envelope from polyphosphate glass. In contrast to this tertiary and secondary phosphates such as $Ca_3(PO_4)_2$ are only difficultly soluble in the glass and are therefore also used as opacifiers in opal glasses. With respect to the production of glass ceramics it would therefore be interesting to eliminate metaphosphates dissolved in the glass from the fused means by means of a devitrification reaction.

It is not possible to eliminate soluble complex $Na_3(PO_4)_2$ from the fused glass mass in order to render the glass less sensitive to temperature changes by devitrification. However, a phosphate separation can be forced by the addition of talcum if partly pure phosphoric acid is added to the batch instead of $NaPO_3$.

EXAMPLE 11

A dry mixture of 98.00 g glass powder, 2.00 g ground basalt, 1.15 g $NaPO_3$, 9.20 g sodium trisilicate and 1.20 g sodium metasilicate-5-hydrate is prepared and then successively wetted with 20 g water, dried at 200° C., finally ground under the addition of 4 g manganese ore and 1 g talcum and finally only slightly wetted with 5 ml of a 16.6% $H_3PO_4$ solution.

The reaction of talcum is very complete, i.e. the entire phosphoric acid can thus be precipitated; for this reason only a fraction of the specified talcum quantity is recommended. A quantity of 0.3 g talcum is sufficient. Instead of the phosphoric acid solution refractory binder 32 of the Metallgesellschaft can also be used after appropriate dilution.

EXAMPLE 12

Of special importance is the relation of the additives to the basic substance glass powder and the quantitative relation of the additives with one another. This in particular applies to the relation phosphate to metal oxide to silicate. Expressed as molar ratio $P_2O_5:MnO_2:SiO_2$ it should approximately be 1:2:8. This is substantiated in the following:

In the humid mixture the powder surface of the glass is coated with a layer of manganese phosphate if the mixture is prepared in the following manner: 100 g glass powder and 9 g sodium trisilicate are mixed in the dry state, first leaving the phosphate and the metal oxides out, then wetted with 20 g water at the most and finally dried at approximately 200° C. Subsequently, the solid mass is finely ground and finally only slightly wetted with 5 ml of an approximately 20% manganese phosphate solution obtained by dissolving $MnO_2$ in phosphoric acid under the addition of $H_2O_2$ as reducing agent. The composition of the manganese phosphate solution is such that the equilibrium

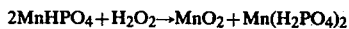

$$2MnHPO_4 + H_2O_2 \rightarrow MnO_2 + Mn(H_2PO_4)_2$$

is maintained.

The solution acts as bonding agent by coating the powder surface of the mixture with a layer of manganese phosphate. From the equation the molar ratio $P_2O_5:MnO_2 = 1:2$ is obtained. The properties of the phosphate layer—as is to be expected with topochemical reactions—correspond to the properties of the solid starting substance, hence they are depending on the surface state of the glass powder, i.e. the phosphate layer is amorphous and aqueous. Assuming that an approximately monomolecular layer develops on the powder surface, the addition quantities of $MnO_2$ and $P_2O_5$ can be calculated. The calculation has shown that the required addition quantities are in accordance with the quantities which have been determined as optimal by means of tests.

The above-mentioned preparation of the manganese phosphate solution was based on the reaction

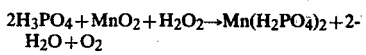

$$2H_3PO_4 + MnO_2 + H_2O_2 \rightarrow Mn(H_2PO_4)_2 + 2H_2O + O_2$$

For this purpose 7 g manganese dioxide $MnO_2$ have been dissolved in 100 g of a 16.5% $H_3PO_4$ solution under the addition of $H_2O_2$ and subsequently the same quantity of $MnO_2$ has once more been suspended in the solution.

The wetted mixture was slowly heated to a foaming temperature of 840° C. in a ceramic mould provided with a dried parting compound consisting of an alumina suspension. The heating time may last 2 to 6 hours, the foaming time 15 to 60 minutes and the gradual cooling down 6 hours and more.

In the following some examples are explained in more detail, wherein the solution of the oxygen acid of a metalloid or, more exactly, of its anhydride is exclusively introduced as bonding agent.

EXAMPLE 13

80 g glass powder with a fineness at which the glass powder has a surface of 0.5 cm²/g, 3.5 g $Sb_2O_3$ (anhydride of the anitmonious acid) and 6.5 g 80% sodium trisilicate are mixed in the dry state, then wetted with 15 g water and finally dried at approximately 200° C. Subsequently, the solid mass was finely ground and heated to 875° C. for 15 minutes in a ceramic mould. The result was a fine-pored foamed glass body with a weight per unit volume of 0.20 g/cm³.

EXAMPLE 14

The procedure was the same as in example 1, however, the ground product was heated to 875° C. for a period of 30 minutes in a ceramic mould. The fine-pored foamed glass body obtained in this manner had a weight per unit volume of 0.15 g/cm³.

Heating of the ground product over a period of more than 30 minutes will not result to a reduction of the weight per unit volume. However, a further reduction of the weight per unit volume can be achieved by the addition of blowing agents.

EXAMPLE 15

Prior to the wetting with water 0.3 g soot were added to the mixture according to example 1. The mass which has been wetted with 15 g water was subsequently dried again at 200° C., subsequently finely ground and heated to 875° C. for 30 minutes in a ceramic mould. The result was a fine-pored foamed glass body with a weight per unit volume of 0.10 g/cm³.

EXAMPLE 16

The procedure was the same as in example 3, however, 0.15 g FeS were added instead of soot. The result again was a fine-pored foamed glass body with a weight per unit volume of 0.10 g/cm³.

To increase the weight per unit volume, volcanic glass material or glass-containing basalt can be added to the mixture.

EXAMPLE 17

Prior to the wetting with water, 15 g of glass-containing basalt were added to the mixture according to example 1. The material which has been finely ground after drying was heated to 875° C. for 30 minutes in a ceramic mould. The fine-pored foamed glass body obtained had a weight per unit volume of 0.20 g/cm³.

EXAMPLE 18

The procedure was the same as in example 5, however, 15 g volcanic glass material were introduced instead of 15 g of basalt. The foamed body obtained again had a weight per unit volume of 0.20 g/cm³ after the finely ground powder has been heated to 875° C. for 30 minutes.

Basically, it must be mentioned that in the case of the introduction of larger quantities of basalt or volcanic glass material, the weight per unit volume of the foamed glass can be further increased. The increase of the weight per unit volume is regularly associated with an increase of the compressive strength. The use of basalt or volcanic glass material has the advantage that these materials are available at lower prices than glass powder.

Conversely, when using additional blowing agents, in particular soot, foamed glass bodies can be obtained the weight per unit volume of which is even below 0.10 g/cm$^3$. It is expedient to use as blowing agents soot types, such as cement black, which are known because of their fineness and their wettability by water.

The use of arsenious acid essentially yields the same results as described in the preceding examples 11 through 16. The hxdroxides of As$_2$O$_3$ or Sb$_2$O$_3$ contained in the wetted mixture are gels with varying water contents which show a similar behaviour as silicid acids. However, the hydroxides of arsenic are more water-soluble than the hydroxide of antimony. The bonding agent used in example 1 which consists of water glass and antimony trioxide is particularly advantageous, since, during the drying, the difficultly soluble NaSbO$_2$ is formed which contains three molecules of water which are only reluctantly be given off. This water is therefore fully available in the foaming process.

In the case of an content of 2 to 3.5% As$_2$O$_3$ or Sb$_2$O$_3$ carbon, sulphides and iron-(II)-silicates contained in the fused glass mass are oxidized. In case soot or another type of carbon is added as blowing agent, 0.3% carbon are advantageously introduced. A correspondingly adjusted quantity of As$_2$O$_3$ is 2%. The use of arsenious acid or of its anhydride is harmless if the necessary precautions are taken in the processing of this component. However, the foamed glass containing arsenic can be processed without any precautionary measure because it is completely unpoisonous.

What we claim is:

1. In a method for the manufacture of foamed glass, the improvement comprising the steps of:
providing a mixture of a finely divided glass and a bonding agent in a weight ratio of glass to bonding agent of 100 parts glass to 5-10 parts bonding agent, the bonding agent being an agent selected from the group of (1) the aqueous solutions of the oxygen acids of beryllium, boron, aluminum, silicon, germanium, arsenic, antimony, tellurium, polonium, astatine and phosphorus, and (2) the aqueous solutions of the salts formed by said oxygen acids neutralized with basic oxides, or basic hydroxides of beryllium, boron, aluminum, silicon, germanium, arsenic, antimony, tellurium, polonium, astatine and of the transition metals having a variable oxidation number;
drying the mixture at a temperature from 20° to 600° C. to thereby transform the bonding agent into a gel having water bound thereto; and
heating the dried mixture to a temperature from 800° to 1,000° C. to thereby melt the mixture and release the bound water from the gel, the released water forming a vaporous cellulating agent which effects the foaming of the molten glass, whereby the molten glass is foamed.

2. The method according to claim 1 in which the bonding agent is selected from the group of the aqueous solutions of phosphoric acid, boric acid, silicic acid, arsenious acid and antimonious acid.

3. The method according to claim 1 in which the bonding agent is selected from the group of the aqueous solutions of the salts of the said oxygen acids with the oxides and hydroxides of vanadium, manganese, iron cobalt, arsenic, and antimony.

4. The method according to claim 1 in which the bonding agent is selected from the group of the aqueous solutions of manganese phosphate and vanadium phosphate.

5. The method according to claim 1 in which a sodium phosphate is used in the bonding agent.

6. The method according to claim 1 in which further an oxidation agent selected from the group of secondary and tertiary manganese phosphates and H$_2$O$_2$ is introduced into the mixture.

7. The method according to claim 1 in which further at least one additional composition selected from the group of the acid oxides of the transition metals, and difficultly soluble secondary and tertiary salts of the components of the bonding agent is introduced into the mixture.

8. The method according to claim 7 in which the additional composition is an amorphous mineral of the class AB$_2$.nH$_2$O of the cristallo-chemical mineral system, in which A and B each designate one atom and n is an integral number, and the said amorphous mineral is introduced into the mixture in a quantity up to approximately 25% by weight related to the total weight of the mixture.

9. The method according to claim 8 in which the amorphous mineral is essentially comprised of manganese black, and is used in a quantity of 0.2 to 2.5% by weight.

10. The method according to claim 8 in which the amorphous mineral is opal, and is used in a quantity of approximately 5% by weight.

11. The method according to claim 6 in which further at least one additional composition selected from the group of the acid oxides of the transition metals, and difficultly soluble secondary and tertiary salts of the components of the bonding agent is introduced into the mixture.

12. The method according to claim 1 in which in the bonding agent the ratio of acid to metal hydroxide is 3:1 to 1:1 parts by weight.

13. The method according to claim 1 in which, prior to the heating step, the dried mixture is ground to a fineness resulting in a BET area of 1 m$^2$/g.

14. The method according to claim 1 in which the quantity of the bonding agent which is introduced into the mixture is a function of the surface area of the finely divided glass material according to the formula $$y = 100(M/F_M) \cdot 2F$$

in which y is the quantity of the bonding agent in g per 100 g of the glass, M is the quantity of the bonding agent in Mol which spreads in a monomolecular layer over a surface area of $F_M = 20000$ m$^2$, and F is the surface area evaluated by the BET-method of 100 g of the glass.

15. The method according to claim 1 in which the mixture of the finely divided glass and the bonding agent is given a plastic consistency, is continuously extruded to an endless strand having the cross-section of plates, and is then both dried and subsequently heated in the strand.

16. The method according to claim 1 in which, prior to the drying of the mixture, the components dissolved in the aqueous solution are precipitated by adding boric acid, in order to increase the surface of the mixture.

17. The method according to claim 16 in which, after the precipitation of the dissolved components, glass powder is added to the mixture in such a quantity as is required for rendering the mixture mouldable.

18. The method according to claim 1 in which approximately 1% lamellar minerals is further added to the mixture to thereby increase the surface area of the mixture, said lamellar minerals forming an aggregate of two-dimensional crystals when they pass the temperature range from 600° to 800° C. during the heating step.

19. The method according to claim 5 in which the sodium phosphate is sodium metaphosphate.

20. The method according to claim 1 in which the glass is selected from the group of waste glass and volcanic glass.

* * * * *